United States Patent [19]

Johnson

[11] Patent Number: 4,957,055
[45] Date of Patent: Sep. 18, 1990

[54] FENDER FOR FLOATING VESSEL

[76] Inventor: Leonard W. Johnson, 483 Main St., Amesbury, Mass. 01913

[21] Appl. No.: 372,291

[22] Filed: Jun. 27, 1989

[51] Int. Cl.⁵ .............................................. B63B 59/02
[52] U.S. Cl. .................................... 114/219; 114/230
[58] Field of Search ................ 114/219, 230; 267/140, 267/153; 405/212

[56] References Cited

U.S. PATENT DOCUMENTS 3,195,498  7/1965  Johns ................................... 114/230
3,464,214  9/1969  King ................................ 114/230 X Primary Examiner—Sherman D. Basinger

[57] ABSTRACT

An improved fender maintains separation between a vessel, such as a pleasure boat, and a wharf to which the vessel is moored. The fender utilizes an elastic shock absorber element and a thrust rod that is connected at one end to the vessel and at the other end to the elastic shock absorber element. The elastic shock absorber element is held by a two-armed support structure at some distance away from the top of the wharf. The support structure prevents the thrust rod from receiving forces from sources other than the vessel and the elastic shock absorber element.

10 Claims, 3 Drawing Sheets

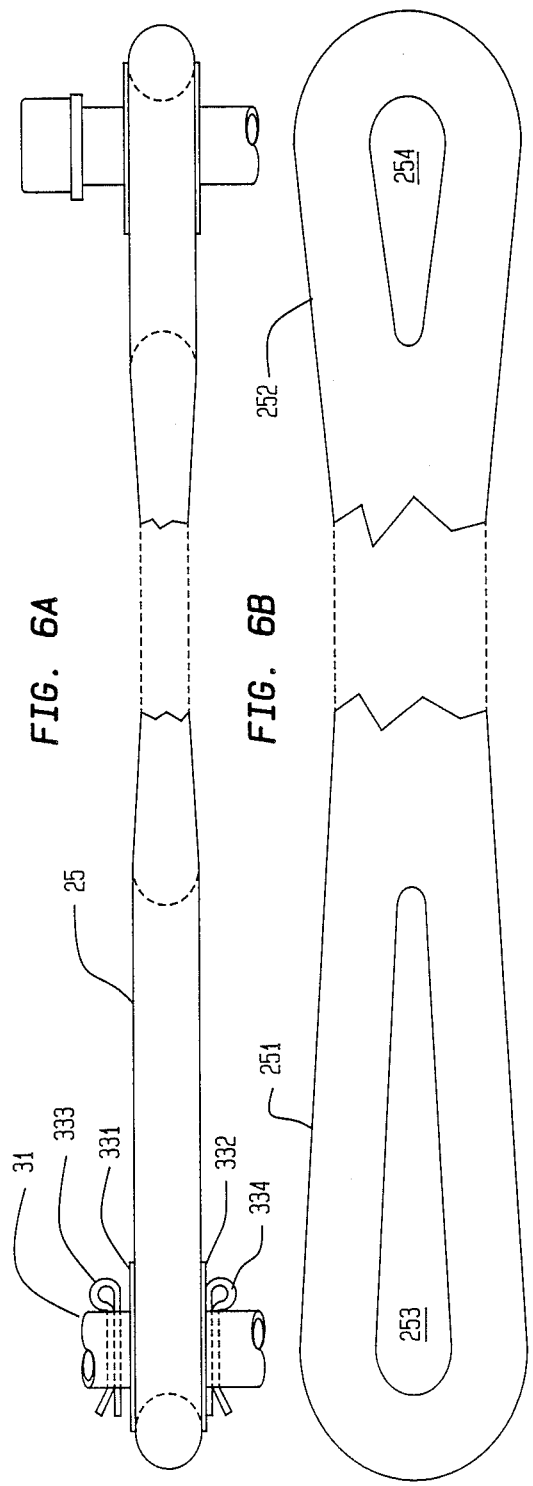
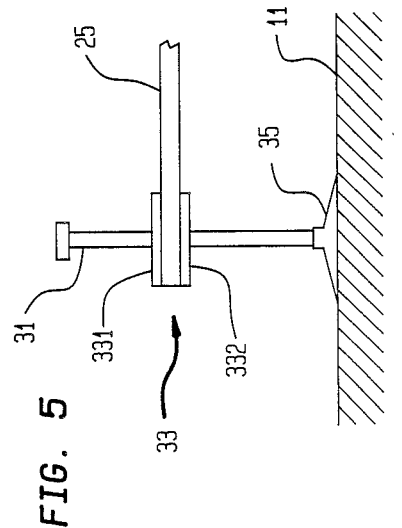
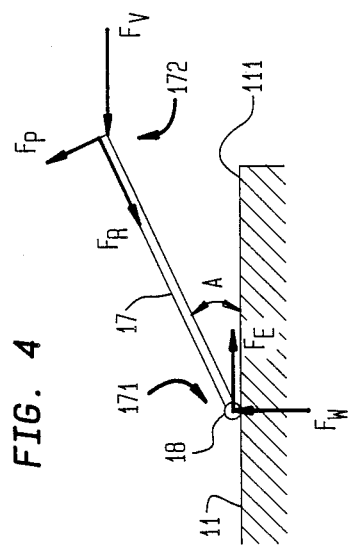

FENDER FOR FLOATING VESSEL

DESCRIPTION

1. Field of Invention

This invention pertains to fenders for vessels, that is, devices of the type used in connection with mooring a floating vessel to a wharf, wherein the device is capable of dissipating energy or otherwise responding so as to protect vessel and wharf from damage caused by motion of one relative to the other.

2. Background Art

A vessel, and especially a pleasure boat, is apt to be moored at a wharf unattended for days and weeks at a time. Pleasure boats commonly range in a length from 15 feet (4.6 m) to 50 feet (15.2 m), but there are a considerable number of pleasure boats having lengths outside this range. If the wharf is located on a narrow fairway, subject to much boat traffic, or on open water, subject to the action of the winds, the hull of a boat so moored, as well as the wharf to which it is moored, is subject to damage from the continual pitching and rolling of the boat and from its bumping and rubbing against the wharf caused by the wakes of passing boats and the natural winds and waves.

A conventional method of protection from such damage to hull and finish, especially for smaller boats, is the use of cushioning bumpers of various sorts, such as braided rope or, more commonly, pneumatic bumpers, available in various shapes, hung between boat and wharf. For ships and other large vessels there are other cushioning devices which can be attached at points along a wharf.

Another method of protection is to line the edge of the wharf with cushioning material such as old fire hose, or with rubber or plastic lineal extrusions made for the purpose.

Another protective method is to tie the boat away from the wharf to an opposite wharf or piling set away from the wharf.

Another protective method employs flexible glass fiber poles or whips, the butt ends of which are held in special holders on the wharf and the tip ends of which are bent and tied to the boat with ropes in such a way as to fend it away from the wharf.

All of the above approaches leave much to be desired for a variety of reasons. Some of these reasons are discussed below.

Bumpers hung from the boat or wharf do not operate over a wide enough gap between boat and wharf. They only exert a fending force when they are actually being compressed between the boat and the wharf and, because the distance over which the bumper can be compressed is comparatively small (a very few inches at best), the fending forces exerted on the hull and wharf are comparatively very large and damaging to the hull. Further, when boat-mounted bumpers are not under compression, they continually swing back and forth against the hull, from the pitching and rolling of the boat, and eventually this action chafes and mars the hull. Also, such bumpers can commonly be flung or squeezed from between the boat and wharf onto the surface of the wharf and allowing the boat to impinge the wharf. Ship bumpers installed at points along a wharf also exert concentrated large forces which might be harmful.

Linear cushioning means lining the edge of the wharf also exert strong forces against the hull and eventually chafe and mar it.

The opportunity for tying off to other wharfs or pilings is not always available, and, when it is, the process of tying off is an awkward maneuver to accomplish.

Whips made of glass fiber are expensive, ineffective against strong forces, and are not usually stowable aboard the vessel, U.S. Pat. No. 4,261,279, issued to the inventor of the present invention, discloses a fender, and is incorporated herein by reference. A preferred embodiment of this fender is shown in FIG. 1 and includes a thrust rod 17, one end 172 of which can be removably attached by a variety of devices 90 to a vessel 10. Several means of attachment are described in patent '279. This embodiment also includes an elastic lateral shock absorber 25, the ends of which can be attached directly to the wharf 11 by means of fastening posts 28 and 29, and to which the other end 171 of thrust rod 17 is attached. This embodiment further includes wheels 18, which are mounted near the wharf end of the thrust rod. The shock absorber 25 absorbs, dampens and restrictively opposes the motion of the thrust rod 17, which is caused by waves striking the boat 10. Under some circumstances, the structure of this embodiment causes problems, such as:

(1) The constant movement of the wheels over the surface of the wharf causes wear and tear on the wharf and on the wheels and axle of the fender, as well as noise, the latter tending to disturb the sleep of persons on board at night.

(2) The range of motion of thrust rod 17 is limited by the lip 111 of the wharf. Thus, an extreme roll of the boat, while close to the wharf, causes the hull fitting 21 to pull the vessel end 172 of the thrust rod 17 too far down so that it sharply strikes the lip 111 of the wharf 11 causing the wheels 18 to be lifted off the wharf 11 and the rounded end 19 of the thrust rod 17 to be knocked out of the socket 20, causing the elastic retaining loop 22 to become disconnected from the hook 24 on the hull fitting 21 and allowing the shock absorber 25, under tension, to poke the thrust rod 17 down between the vessel and the wharf resulting in scarring of the hull and possible damage to the fender.

(3) Because the wharf 11 is often one or more feet below the deck 101 of the vessel 10, it is often very difficult to mount the device 90 for attaching the vessel end 172 of the thrust rod 17 to the vessel 10 on top of the deck 101, where many vessel owners prefer to attach such devices. Instead the device often must be attached to the hull of the vessel 10.

(4) Because the thrust rod 17 is typically not horizontal, the configuration of this embodiment is not the most efficient for absorbing the horizontal forces caused by the waves striking the boat.

SUMMARY OF THE INVENTION

It is an object of the present invention to provide a boat fender that does not rub against the hull of the vessel in connection with which it is employed. It is a further object of the present invention to provide a boat fender having superior fending characteristics, including the following: (i) application of a fending force from any distance of a wide range of distances between vessel and wharf and (ii) application of a fending force that increases inversely in smooth relation to the distance between vessel and wharf.

It is a further object of the invention to provide an improved boat fender that is less prone to wear and tear and malfunctions.

It is also an object of the invention to provide an improved boat fender that is relatively quiet.

It is also an object of the invention to provide a boat fender that can be removably attached to a vessel by means of a device, which can be attached to the hull or the deck of the vessel.

Another object of the invention is to provide a boat fender that can be removably attached to the wharf (or stanchions or fittings).

It is a further object of the invention to provide an improved boat fender that can more efficiently absorb the horizontal forces caused by waves striking the boat.

It is a further object of the invention to provide a boat fender having a fending force range that is capable of some adjustment in connection with the installation thereof.

It is also an object of the invention to provide an economical and practical boat fender.

It is also an object of the invention to provide a boat fender capable of being designed for any desired range of fending force, such range being one of a large field of possible ranges.

Another object is to provide a boat fender, employing one or more shock absorber elements, in such a way that the fending force thereof can be increased by adding additional shock absorber elements.

A further object is to provide a boat fender that can be removably attached to the wharf or to stanchions, as well as the vessel.

These and other objects of the invention are achieved by providing a thrust rod having two ends, hereinafter called a "wharf end" and a "vessel end"; an arrangement for removably attaching the vessel end of the thrust rod to the vessel; an elastic shock absorber element, which is attached to the wharf end of the thrust rod; and an arrangement for supporting the elastic shock absorber element at some height over the wharf or some distance under the wharf surface.

BRIEF DESCRIPTION OF DRAWINGS

These and other objects and features of the invention are more readily understood by the consideration of the following detailed description taken with the accompanying drawings, in which:

FIG. 4 is a schematic depicting some of the forces that act on the thrust rod of the device shown in FIG. 1, and the forces transmitted by the thrust rod to elastic shock absorber and the wharf; and FIG. 5 shows a stanchion of a preferred embodiment of the invention;

FIG. 6a shows how the elastic shock absorber may be connected to the stanchions; and FIG. 6b shows the two ends of the elastic shock absorber of a preferred embodiment of the invention;

wherein like reference numerals refer to like items.

DESCRIPTION OF SPECIFIC EMBODIMENTS

Figure 2:
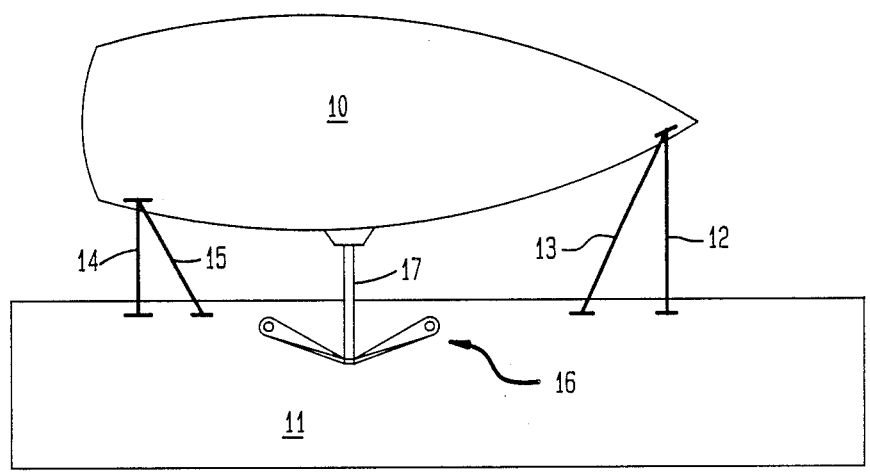
FIG. 2 is a schematic plan view representing a vessel moored to a wharf by means of docking lines, and being held away from the wharf by means of an embodiment of the invention.

Referring now to the particular embodiments of the invention shown in the drawings by way of example only, FIG. 2 shows vessel 10 moored to wharf 11, preferably, but not necessarily, a floating wharf or one where the water level does not vary considerably in relation to the top surface of the wharf, by means of bow docking line 12, bow spring line 13, stern docking line 14, and stern spring line 15. The vessel 10 is being fended away from wharf 11 by means of the boat fender assembly 16 in accordance with this invention.

Figure 1:
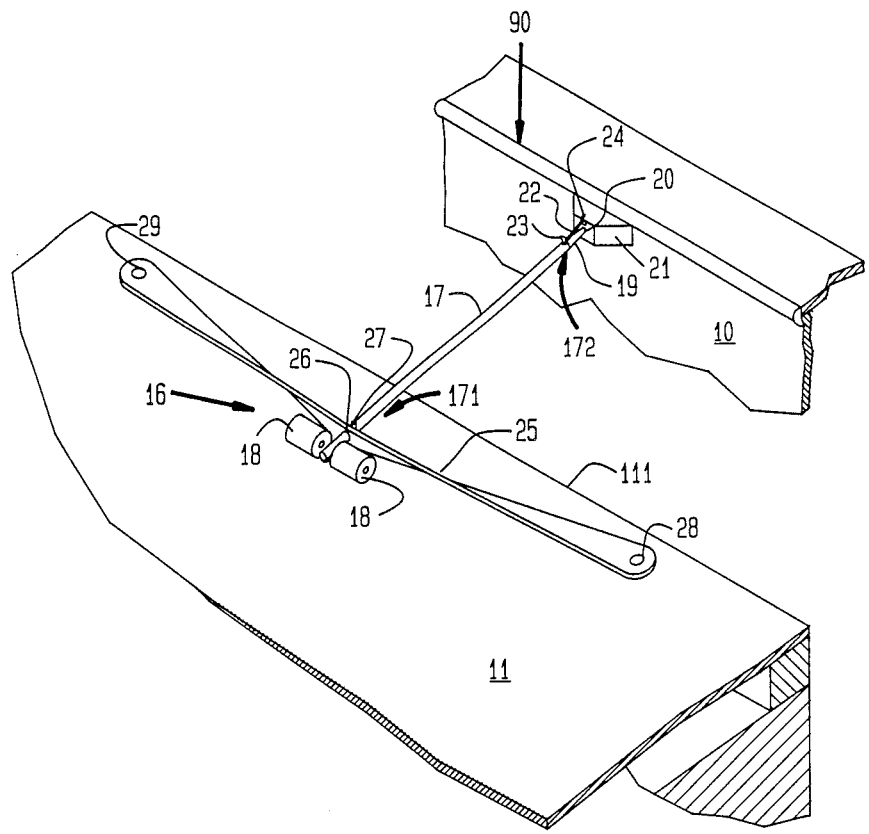
FIG. 1 is a perspective view of an embodiment of the device disclosed in U.S. Pat. No. 4,261,279, issued to the inventor of the present invention.
Figure 3:
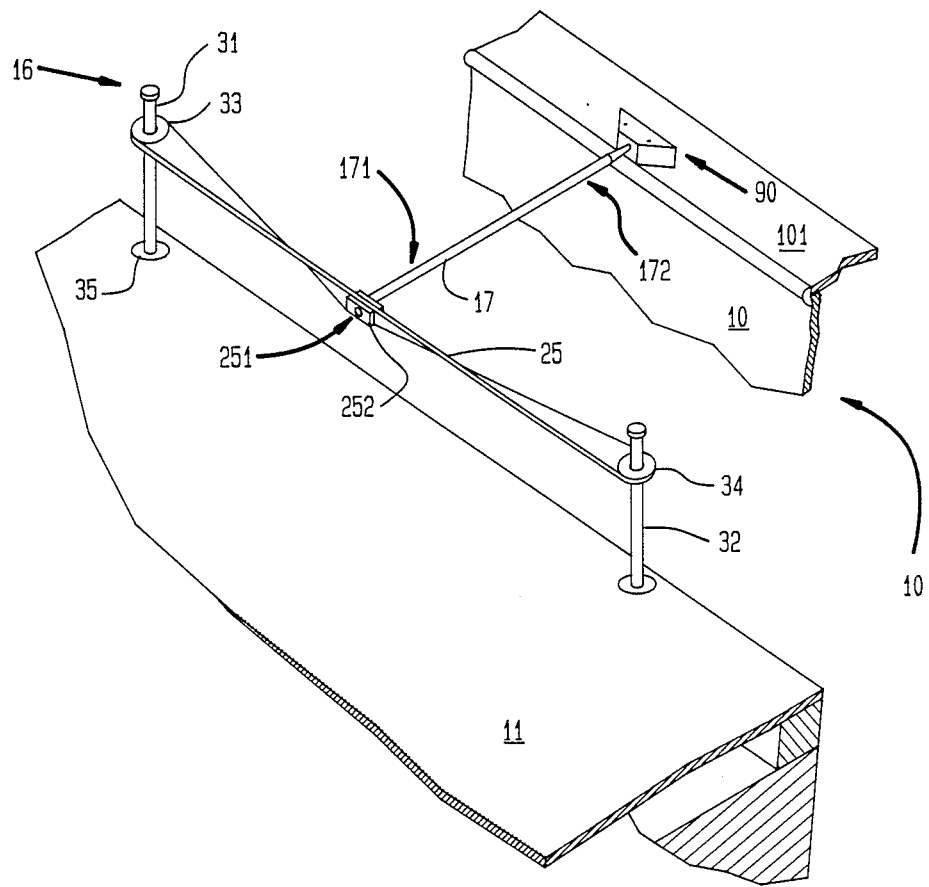
FIG. 3 is a perspective view of a preferred embodiment of the invention.

The boat fender assembly 16 of FIG. 2 is shown in further detail in FIG. 3. The assembly 16 includes a thrust rod 17, which preferably is a stiff elongated rod. The vessel end 172 can be removably attached to the vessel by a variety of attachment devices 90, some of which are described in the inventor's previous U.S. Pat. No. 4,261,279. One way to attach the thrust rod to the vessel is to mount a suction cup to the vessel end 172 of the thrust rod 17, such that the suction cup can be removably attached to the hull of the vessel, as described in patent '279 (column 4, lines 44-49). In a preferred embodiment of the present invention, the attachment device 90 depicted in FIG. 1 of this application, which also is described in patent '279 (column 3, lines 34-40), can be used. One of the advantages of using the latter device in the present invention is that it can be mounted on the deck 101 of the vessel 10, as shown in FIG. 3 of this application, instead of on the hull as shown in FIG. 1. (In one embodiment of the invention, the device 90 attaching the thrust rod to the vessel can be slightly modified from the structure shown in FIG. 1; the screw eye 23 and the hook 24 can be mounted on the side instead of on top as shown. The benefit of this modified version of the device 90 shown in FIG. 1 is that with the elastic retaining loop 22 mounted on the side of the thrust rod 17 is less likely to fall off as a result of heavy rocking of the vessel.)

The boat fender assembly 16 also includes an elastic shock absorber element 25 that is attached to the wharf end 171 of the thrust rod 17. As disclosed in patent '279, the elastic shock absorber element can be comprised of one or more conventional rubber snubbers, coiled springs, or other elastic materials (column 4, lines 22-32). In the embodiment depicted in FIG. 3, the thrust rod 17 is connected to the middle of the elastic shock absorber element 25 by means of a screw 251 and two plates 252 on opposing faces of the elements contoured to fit snugly around and clamp the rubber tightly, so the screw is less likely to tear out the hole. The two ends of the elastic shock absorber element 25 are supported at some height over the wharf 11. This support can be accomplished by a variety of means, including a V-shaped or a Y-shaped structure, the base of which can be secured to the wharf. The elastic shock absorber element can then be strung between the two arms of the structure. In the embodiment shown in FIG. 3, two stanchions 31 and 32 are used to support the elastic shock absorber element 25. The advantage of this arrangement is that the stanchions can be spaced apart as much as desired.

The principal advantage of the present invention over prior art is the improved performance of the thrust rod whose elevated position prevents it from striking the wharf lip and causing malfunctions.

Another of the advantages of the present invention over the prior art is that the thrust rod 17, being aligned so that it is horizontal, more efficiently absorbs the horizontal forces of the waves striking the boat. FIG. 4 shows a schematic representing the forces working on the thrust rod 17 of the device disclosed in patent '279. $F_V$ represents the horizontal force of the vessel pushing against the thrust rod as a result of the waves striking the vessel. Although large swells may cause the force that the vessel applies to the thrust rod to have a vertical component, such a vertical component is not shown for the sake of simplicity. The horizontal force applied by the vessel, $F_V$, can be considered to have two components, a component, depicted as vector $F_R$, that is parallel to the thrust rod 17, and a component, depicted as vector $F_P$, that is perpendicular to the thrust rod. Force $F_P$ has no substantial opposition and tends to pivot the thrust rod 17 about a point at its wharf end 172. Force $F_R$ is opposed, by the force, $F_W$, of the wharf 11 on the wheels 18 attached to the wharf end 171, and by the force, $F_E$, of the elastic shock absorber element. It is apparent from FIG. 4 that consequently as angle A increases, the $F_P$ component of $F_V$ increases, $$F_P = F_V \sin A; \text{ and } F_R = F_V \cos A$$

causing the thrust rod 17 to pivot further for a given $F_V$. (The wharf end 171 of the thrust rod 17 does tend to move along the surface of the wharf 11 away from the wharf lip 111 as $F_V$ is applied; however, this translation is not considered here for the sake of simplicity.) When circumstances keep angle A small, the thrust rod 17 is less likely to pivot excessively, $F_V$ is more directly opposed by $F_E$, and the wharf exerts less force $F_W$ on the thrust rod. However, when angle A is small, thrust rod 17 is more likely to strike the wharf lip 111, and the device for attaching the vessel end 172 of the thrust rod 17 to the vessel must be mounted lower on the hull of the vessel.

In the present invention, the thrust rod 17 can be kept generally horizontal, and can be located at any height over the wharf. (For high wharfs, it may be possible to mount the fender assembly in a cavity below the wharf surface.) Thus, it is more practical to mount the device 90 for attaching the thrust rod to the vessel on the deck 101 of the vessel 10—a more convenient and safe location for many vessel owners.

FIG. 5 shows one of the stanchions 31 of the embodiment depicted in FIG. 3. The stanchion 31 can be affixedly attached to the wharf 11 by means of a base 35 screwed to the wharf. Other means of attachment, well known in the art, can be used, including such means that would permit easy removal of the stanchion 31. The elastic shock absorber element 25 can be attached to the stanchion 31 by a wide variety of devices 33 well known in the art. In FIG. 5, the elastic shock absorber element 25 has a hole in it, through which the stanchion is inserted. To hold the elastic shock absorber element at the desired height, two washers (or collars), 331 and 332, are used. Both washers, 331 and 332, may be affixedly attached to the stanchion, by cotter pins, by collars with set screws or by welding for example. One washer 331 is attached above the elastic shock absorber element, and the other washer 332 is attached below the elastic shock absorber element. FIG. 6a shows how the ends of the elastic shock absorber element 25 may be attached to a stanchion 31 by means of washers 331 and 332 and cotter pins 333 and 334. An alternate device 33 can be slid up and down the stanchion so that the height of the elastic shock absorber element 25 can be adjusted. Another alternative is to attach the elastic shock absorber element to the stanchions by ropes, as disclosed in patent '279 (column 4, lines 40–42). Patent '279 also discloses how the range of the fending force $F_E$ produced by the elastic shock absorber element of the present invention may be adjusted (column 4, lines 7–21).

FIG. 6b shows a top view of the two ends of the elastic shock absorber element of a preferred embodiment of the invention. The two ends, 251 and 252, each have an elongated hole, 253 and 254 respectively. The elongated holes in the ends allow the shock absorber to be slipped off the stanchions if the washers are not too large in diameter. The left end 251 of the shock absorber shown in FIG. 6b has an extra long hole 253 to make it easier to remove that end from the stanchion. In putting the fender out of service, the thrust rod is first disconnected from the boat, and then the large hole end 251 of the shock absorber is slipped off its stanchion. The small hole end 252 of the shock absorber can remain attached to its stanchion, while the thrust rod and the shock absorber can be rotated around the small hole end, and be left lying on the wharf away from the boat and out of the way.

Accordingly, while the invention has been described with particular reference to specific embodiments thereof in the interest of complete definiteness it will be understood that it may be embodied in a variety of forms diverse from those shown and described without departing from the spirit and scope of the invention as defined by the following claims.

I claim:

1. A fender for maintaining separation between a vessel and a wharf to which the vessel is moored, such fender comprising:

a thrust rod having two ends, hereinafter called a "wharf end" and a "vessel end;"

attachment means for attaching the vessel end of the thrust rod to the vessel;

an elastic shock absorber element attached to the wharf end of the thrust rod, such that the elastic shock absorber element is transverse to the thrust rod, the elastic shock absorber element having a first end and a second end, the elastic shock absorber element being linked to the wharf end of the thrust rod at some point between the first and second ends of the elastic shock absorber element; and elevation means, rigidly attached to the wharf, for supporting the elastic shock absorber element and the thrust rod at some distance away from the top of the wharf, such that the thrust rod is substantially horizontal and is subject only to forces applied by the elastic shock absorber element and the vessel, the elevation means including a first arm and a second arm attached respectively to the first and second ends of the elastic shock absorber element;

such that translation of the wharf end of the thrust rod with respect to the wharf, such translation caused by movement of the vessel towards the wharf, is opposed by forces exerted by the elastic shock absorber element.

2. The fender of claim 1, wherein
   the elastic shock absorber element includes first and second sub-elements, each sub-element having first and second ends;

the first ends of the first and second sub-elements are linked to the wharf end of the thrust rod; and the second ends of the first and second sub-elements are lined to the elevation means.

3. The fender of claim 1, wherein the first and second arms of the elevation means include a first stanchion and a second stanchion respectively; and the first and second ends of the elastic shock absorber element are linked to the first and second stanchion respectively.

4. The fender of claim 3, wherein the thrust rod is linked to the elastic shock absorber element near the midpoint of the distance between the first and second ends.

5. The fender of claim 4, wherein each of the first and second stanchions further include a base and retaining means for retaining an end of the shock absorber element at a distance away from the base.

6. The fender of claim 5, wherein the retaining means includes a hole in the stanchion in cooperation with which the shock absorber element is linked to the stanchion.

7. The fender of claim 1, wherein the elevation means is attached to the top of the wharf.

8. A fender for maintaining separation between a vessel and a wharf to which the vessel is moored, such fender comprising:

a thrust rod having two ends, hereinafter called a "wharf end" and a "vessel end;"

attachment means for attaching the vessel end of the thrust rod to the vessel;

attachment means for attaching the vessel end of the thrust rod to the vessel;

an elastic shock absorber element having (i) first and second ends, between which the elastic shock absorber element is linked to the wharf end of the thrust rod near the midpoint of the distance between the first and second ends, (ii) opposing faces and (iii) a hole at the point of attachment to the wharf end of the of the thrust rod;

a pair of plates disposed on the opposing faces of the shock absorber element, each plate having a hole coaxial with the hole in the shock absorber element;

a screw inserted through the holes of the plates and the shock absorber element, into the thrust rod, for attaching the thrust rod to the shock absorber element; and elevation means for supporting the elastic shock absorber element at some distance away from the top of the wharf, the elevation means including a first stanchion and a second stanchion, to which the first and second ends of the elastic shock absorber element are respectively linked;

such that translation of the wharf end of the thrust rod with respect to the wharf, such translation caused by movement of the vessel towards the wharf, is opposed by forces exerted by the elastic shock absorber element.

9. The fender of claim 8, wherein each of the first and second stanchions further includes a base and retaining means for retaining an end of the shock absorber element at a distance away from the base.

10. The fender of claim 9, wherein the retaining means includes a hole in the stanchion in cooperation with which the shock absorber element is linked to the stanchion.

* * * * *